Sept. 23, 1930.    F. BARRETT    1,776,245
RULER OR SCALE
Filed Jan. 16, 1928

INVENTOR
Florine Barrett
BY Chappell & Earl
ATTORNEYS

Patented Sept. 23, 1930

1,776,245

UNITED STATES PATENT OFFICE

FLORINE BARRETT, OF FLINT, MICHIGAN

RULER OR SCALE

Application filed January 16, 1928. Serial No. 247,084.

The main object of this invention is to provide a ruler or scale for use in schools facilitating the teaching of fractions and fractional measurements.

Objects pertaining to details and economies of my improvements will appear from the description to follow. The invention is clearly defined in the claims.

A ruler or scale embodying the features of my improvements is clearly illustrated in the accompanying drawing, in which.

Figure 1:
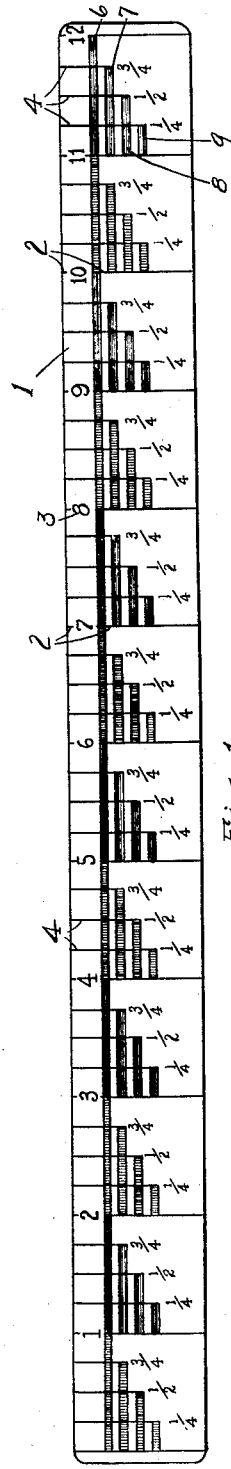
Fig. 1 is a side view of a ruler embodying the features of my invention graduated to quarter inches.

Referring to the drawing, the ruler illustrated is a one-foot rule having transverse graduating lines 2 dividing the ruler into inches. The lines 2 extend transversely across the rule with the exception of the breaks therein to receive the inch indicia 3, the interruptions, however, being merely a matter of convenience in positioning the indicia.

Figure 2:
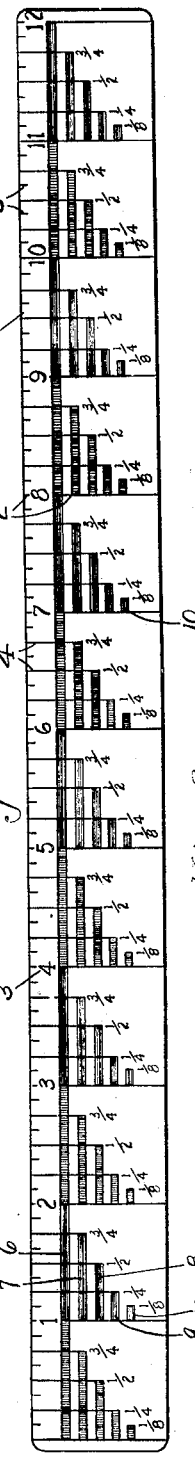
Fig. 2 is a view of the opposite side of the ruler or scale graduated to one-eighth inch.
Figure 3:
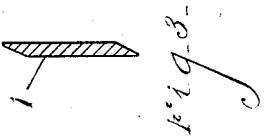
Fig. 3 is a cross section through the ruler.

On the side of the rule shown in Fig. 1 the inches have fractional quarter-inch graduations 4 while on the opposite side of the ruler as shown in Fig. 2, there are additional one-eighth inch graduations 5. Each inch space has longitudinal lines 6, 7, 8 and 9 printed thereon, these lines being arranged in parallel stepped relation and being of a length corresponding to one-fourth, one-half, three-fourths and inch lengths. The ends of the transverse fractional lines or graduations terminate at the ends of the longitudinal lines.

In Fig. 2 an additional longitudinal line 10 is provided of a length corresponding to an eighth inch. These lines have fractional indicia associated therewith and the lines of adjacent spaces are contrastingly colored, red and blue being indicated.

My improved scale or ruler is especially designed by me for school work, experience having demonstrated its practicability in the teaching of fractions and the measurement of fractional parts of an inch.

The longitudinal lines constitute a visual example of the fractions of the major units or spaces.

While I have shown my improvements as I have embodied the same for a foot scale, it will be understood that the same principle is applicable to the metric system of measurement or scales based thereon.

Having thus described my invention what I claim as new and desire to secure by Letters Patent is:

1. A ruler or scale graduated in inches and fractions thereof, the graduations being indicated by parallel lines disposed transversely of the ruler, each inch space having a plurality of parallel relatively heavy lines disposed longitudinally of the ruler, one of which is an inch in length, the others being of lengths corresponding respectively to the fractions into which the inch is divided, said longitudinal lines being arranged in stepped relation and the transverse fractional scale lines terminating at the ends of the corresponding longitudinal lines, the longitudinal lines of adjacent inch spaces being in contrasting colors, said longitudinal lines having fractional indicia associated therewith.

2. A ruler or scale graduated in inches and fractions thereof, the graduations being indicated by parallel lines disposed transversely of the ruler, each inch space having a plurality of parallel relatively heavy lines disposed longitudinally of the ruler, one of which is an inch in length, the others being of lengths corresponding respectively to the fractions into which the inch is divided, said longitudinal lines being arranged in stepped relation and the transverse fractional scale lines terminating at the ends of the corresponding longitudinal lines.

3. A ruler or scale graduated in inches and fractions thereof, the graduations being indicated by parallel lines disposed transversely of the ruler, each inch space having a plurality of relatively heavy lines of different lengths arranged longitudinally of the ruler in stepped relation with their ends terminating each at its corresponding transverse graduation line, said longitudinal lines having fractional indicia associated therewith, the longitudinal lines of adjacent inch spaces being in contrasting colors.

4. A ruler or scale graduated into major spaces, said major spaces having fractional sub-divisions and lines of graduated lengths corresponding respectively to the major spaces and the fractional sub-divisions thereof and being coterminous with said spaces and sub-divisions, said lines being disposed longitudinally of the ruler, the major graduations having scale indicia associated therewith and the fractional graduations having fractional indicia associated therewith and with said longitudinal lines, the longitudinal lines of adjacent major spaces being in contrasting colors.

5. A ruler or scale graduated into major spaces, said major spaces having fractional sub-divisions and lines of graduated lengths corresponding respectively to the major spaces and the fractional sub-divisions thereof and being coterminous with said spaces and sub-divisions, said lines being disposed longitudinally of the ruler, the major graduations having scale indicia associated therewith and the fractional graduations having fractional indicia associated therewith and with said longitudinal lines.

6. A ruler or scale graduated into major spaces, said major spaces having fractional subdivisions and lines of graduated lengths corresponding respectively to the major spaces and the fractional subdivisions thereof and being coterminous with said spaces and subdivisions, said lines being disposed longitudinally of the ruler, the longitudinal lines of adjacent spaces being in contrasting colors.

7. A ruler or scale graduated into major spaces, said major spaces having fractional subdivisions and lines of graduated lengths corresponding respectively to the major spaces and the fractional subdivisions thereof and being coterminous with said spaces and subdivisions, said lines being disposed longitudinally of the ruler.

In witness whereof I have hereunto set my hand.

FLORINE BARRETT.